Figure 1:
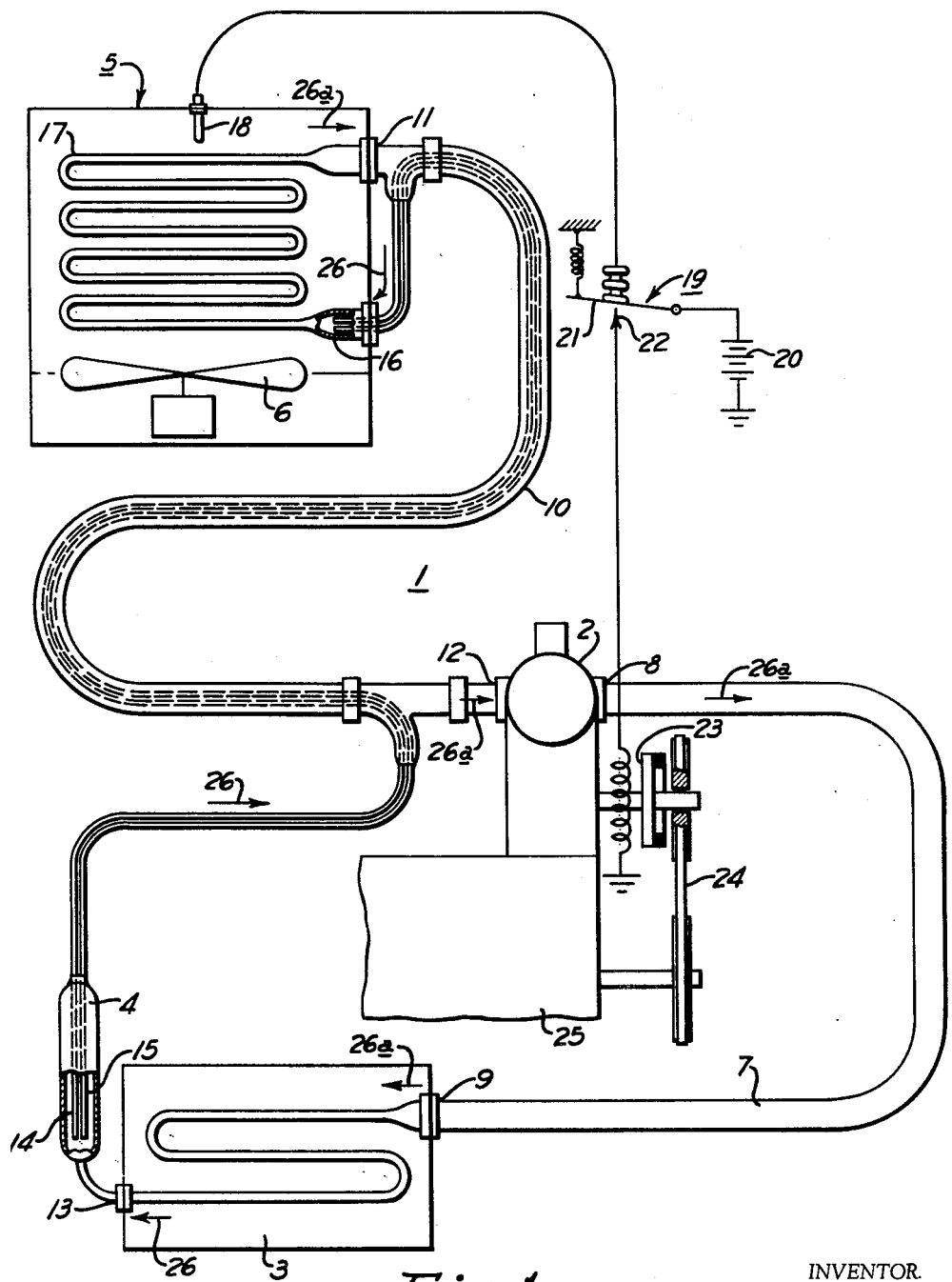

United States Patent Office 3,145,545
Patented Aug. 25, 1964

3,145,545
AIR CONDITIONING AND REFRIGERATION
APPARATUS FOR MOTOR VEHICLES
Wilbert J. Jaeger, 348 N. Flower St., Orange, Calif.
Filed Oct. 10, 1962, Ser. No. 229,571
2 Claims. (Cl. 62—323)

This invention relates to air conditioning and refrigeration apparatus for motor vehicles and particularly for passenger automobiles, busses and trucks wherein a variable speed compressor of the apparatus is driven by the engine of the automobile, bus or truck.

Heretofore, conventional motor vehicle air conditioning apparatus has included a condenser, a variable speed compressor driven by the engine of the vehicle, an evaporator, an expansion valve usually of the thermostatic type, a receiver interconnected between the condenser and the evaporator, a drier for removal of moisture in the refrigeration system and a sight glass to determine level of refrigerant in the system. This apparatus is charged with an appropriate refrigerant to bring about cooling of the air through vaporization and condensation thereof.

The expansion valve regulates supply of refrigerant to the evaporator to assure that the evaporator has the proper amount of refrigerant for efficient operation. Operation of the expansion valve occurs when the temperature of the refrigerant on the outlet side of the evaporator reaches a first given temperature to open the valve and a second given temperature to close same.

Inasmuch as the expansion valve is closed at times when the compressor operates, a receiver is required to collect and store the liquid refrigerant which flows from the condenser to the evaporator.

The conventional air conditioning apparatus has some substantial disadvantages which result from use of the expansion valve and the receiver. For example, closing of the expansion valve when the compressor is in operation produces a loss in horsepower of the vehicle engine. This loss of horsepower results from creation of a very low pressure in the line between the evaporator and the compressor when the expansion valve has closed and a build-up of greater pressure than normal on the discharge side of the compressor. When the expansion valve opens, prior to which the compressor has been operating, there is then a surge of liquid refrigerant into the evaporator with a resultant rise in vapor pressure between the evaporator and the compressor. Because of a time lag until the low pressure side of the refrigerant system returns to its normal relationship with the high pressure side, the compressor is required to overwork and this reduces available horsepower for travel of the motor vehicle.

The expansion valve has a further disadvantage in that it requires a drier in the refrigerant lines to remove moisture from the refrigerant. Since a very small amount of moisture in the refrigerant system may solidify on the needle or seat of the expansion valve, substantially if not all of the moisture must be removed from the refrigerant to avoid freezing of the expansion valve at or near closing position of the needle.

The combination of the expansion valve and the receiver of the conventional air conditioning apparatus generates a substantial loss at times in available horsepower for travel of the vehicle. In this regard, upon shutdown of the compressor, the expansion valve and/or the receiver do not permit an equalization in pressure between the head pressure side of the refrigerant system and the suction pressure side thereof. Consequently, when a thermostatic device for controlling temperature of the air within a vehicle effects operation of a control to start the compressor, the compressor must commence its work against a pressure differential between this head pressure side of the refrigerant system and the suction pressure side thereof. This pressure differential may range from about 15 pounds per square inch to about 150 pounds per square inch and requires a substantial amount of horsepower from the vehicle engine. It is not uncommon for a motorist to experience a marked hesitation in travel speed of his automobile when the compressor starts to operate after a shutdown.

My invention in air conditioning and refrigeration apparatus for motor vehicles overcomes the drawbacks of the conventional apparatus relating to consumption of excessive horsepower of the vehicle engine and the disadvantages resulting from use of the expansion valve and the receiver. Actually, my invention eliminates the expansion valve, the receiver, the drier and the sight glass of the conventional apparatus. Specifically, in air conditioning and refrigeration apparatus for motor vehicles having an evaporator with a refrigerant inlet and refrigerant outlet, a variable speed compressor adapted to be driven by an engine of the vehicle, a condenser with a refrigerant inlet and a refrigerant outlet, and a pipe joined to the compressor outlet and the refrigerant inlet of the condenser, it comprises at least two capillary tubes having a refrigerant connection with liquid refrigerant from the refrigerant outlet of the condensor. Each of the two capillary tubes extends to and has a refrigerant connection with the refrigerant inlet of the evaporator to deliver liquid refrigerant from the two capillary tubes directly into the evaporator. A conduit extends between the refrigerant outlet of the evaporator and the compressor to form a suction connection for refrigerant between the evaporator and the compressor. At least a portion of the length of each of the two capillary tubes is disposed in a heat exchange relationship with a part of the length of the conduit to form a heat exchanger between the two capillary tubes and the conduit. This heat exchanger is so located that it extends to a position adjacent the refrigerant outlet of the evaporator.

Preferably there is an accumulator in refrigerant connection with the liquid refrigerant from the refrigerant outlet of the condenser and the two capillary tubes are in refrigerant connection with this accumulator.

I have found that it is desirable to have the conduit made from a flexible material such as rubber, nylon, polyethylene, and any other suitable plastic material to take into account vibration due to engine operation and operation of the motor vehicle.

Figure 2:
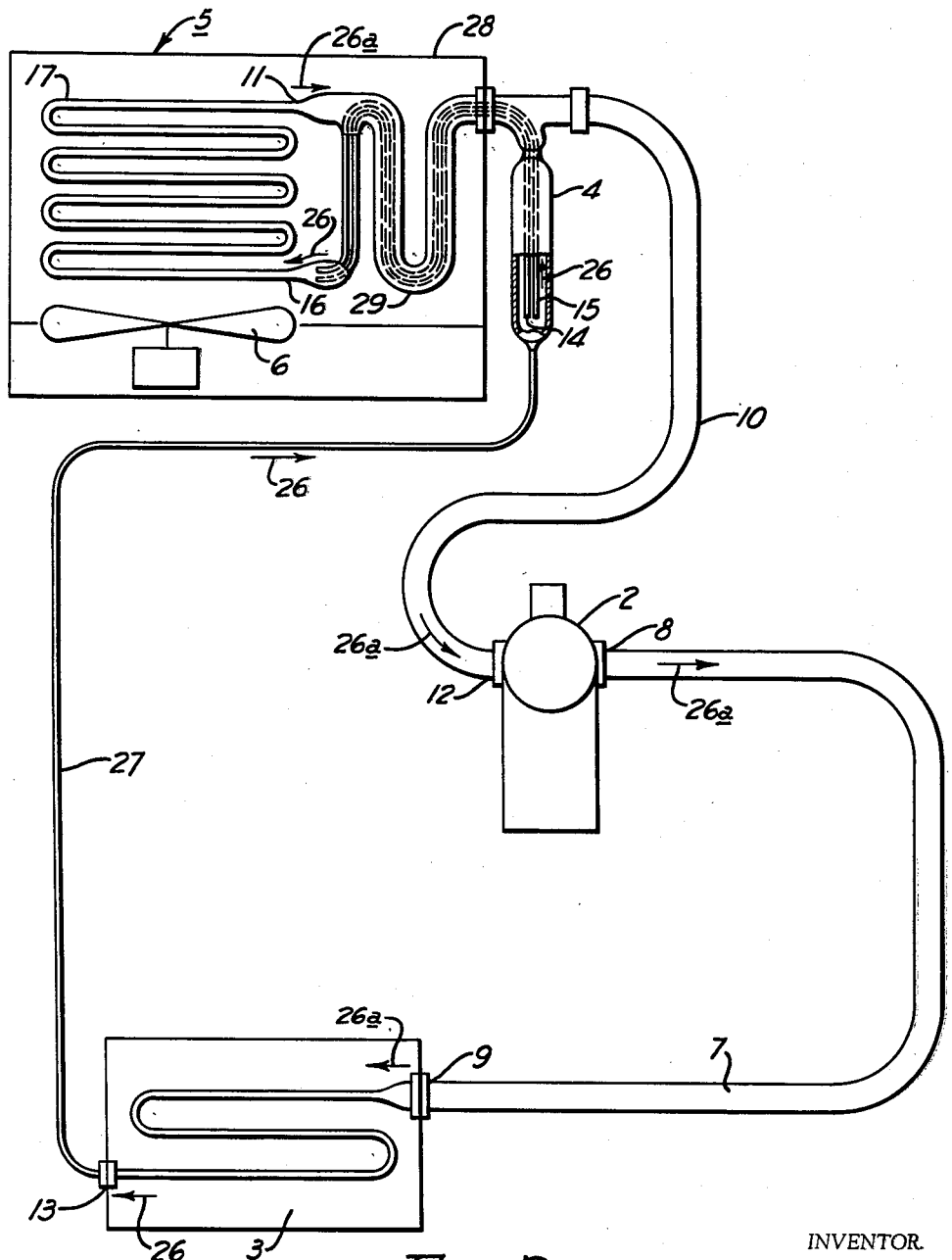

In the accompanying drawings, I have shown two preferred embodiments of my invention in which:

FIGURE 1 is a schematic diagram of an air conditioning apparatus for motor vehicles which includes my invention; and FIGURE 2 is a schematic diagram of a modification of the apparatus of FIGURE 1.

Referring to FIGURE 1, the air conditioning apparatus 1 there shown comprises a conventional variable speed compressor 2, a condenser 3, an accumulator 4, and an evaporator 5 with a motor driven fan 6. A pipe 7 connects a discharge side 8 of the compressor to an inlet 9 of the condenser 3 and conveys vaporized refrigerant from the compressor to the condenser.

A conduit 10 extends from an outlet 11 of the evaporator 5 to the inlet side 12 of the compressor 2 and forms a suction line for flow of vaporized refrigerant from the evaporator to the compressor.

Joined to an outlet 13 of the condenser 3 is the accumulator 4 to which is connected two capillary tubes 14 and 15 which extend therefrom to an inlet 16 of the evaporator coil 17. These two capillary tubes are shown disposed substantially in parallel and are positioned at the inlet 16 of the evaporator to deliver liquid refrigerant thereto without use of an expansion valve. A part of the length of these two capillary tubes is disposed within a part of the length of the conduit 10 to form a heat exchanger between the capillary tubes and the conduit. As shown, the heat exchanger extends to a position adjacent the outlet 11 of the evaporator whereat the two capillary tubes project out through the conduit 10 and to the inlet 16 of the evaporator.

To regulate the amount of cooling of a motor vehicle in which this apparatus is installed, a thermostatic device 18 operates a spring-loaded switch 19 which is in circuit with a battery 20. When the switch 19 is closed so that arm 21 thereof engages contact 22, a magnetic clutch arrangement 23 is actuated whereby a sheave and pulley combination 24 operated by a vehicle engine 25 starts the variable speed compressor 2 for air conditioning the vehicle.

Arrows 26 indicate the direction of flow of liquid refrigerant and arrows 26a indicate the direction of flow of vaporized refrigerant in the apparatus of FIGURE 1. The accumulator compensates for the pressure temperature relationship of the refrigerant to assure that liquid refrigerant is available for flow through the capillary tubes to the evaporator during operation of the apparatus.

My invention relates to the variable speed compressor and resides in a combination of the two capillary tubes which deliver liquid refrigerant directly into the inlet of the evaporator, the conduit extending between the outlet of the evaporator and the compressor, and the disposition of the two capillary tubes in heat exchange relationship with the conduit to form a heat exchanger between the capillary tubes and the conduit with the heat exchanger so located that it extends to a position adjacent the outlet of the evaporator. It is the combination of the two capillary tubes and the heat exchanger formed by the capillary tubes and the conduit from the evaporator to the compressor, and the location of the heat exchanger so that it extends to a position adjacent the outlet of the evaporator that permits my invention to function efficiently and properly with a variable speed compressor and thereby eliminate many of the drawbacks, problems and disadvantages of conventional motor vehicle air conditioning apparatus with expansion valves, receivers, driers and sight glasses.

The two capillary tubes effect elimination of the expansion valve and the receiver for they provide the required pressure drop in the liquid refrigerant delivered to the evaporator so that vaporization of the refrigerant follows.

I have found that at least two capillary tubes most be used to supply a sufficient volume of liquid refrigerant to the evaporator for proper and efficient operation of the apparatus. One capillary tube is unable to supply sufficient volume of refrigerant especially in periods when the compressor is operating at high speeds. If the diameter of one capillary tube is enlarged sufficiently to supply an adequate volume of refrigerant to the evaporator when the compressor operates at high speeds, then the required pressure drop in the liquid refrigerant is not present at the inlet to the evaporator when the compressor operates at low and medium speeds.

On the other hand, where the diameter of the single capillary tube is designed for medium speed operation of the compressor, then, when the compressor is speeded up, there is an excessive pressure build-up at the discharge side of the compressor accompanied by extremely low suction pressures on the inlet side thereof to such a degree that the unit ceases to function. Also, air conditioning apparatus with a single capillary tube selected for its inside diameter and length for operation at high or medium speeds of the compressor encounters problems at low speeds of the compressor because of absence of the required pressure drop of the liquid refrigerant at the inlet to the evaporator. Under such circumstances, the apparatus ceases to function.

The heat exchanger formed by the conduit 10 and the two capillary tubes 14 and 15 and located at a position adjacent the outlet of the evaporator plays an important role in my invention in that it assures substantially complete if not complete vaporization of refrigerant in the conduit between the evaporator and the compressor. This results from the hot liquid refrigerant of the condenser traversing the capillary tubes and supplying the heat for effecting vaporization of that part of the refrigerant in the suction line which has not vaporized. This is highly important in motor vehicle air conditioners which use a variable speed compressor to effect a balanced system and to prevent liquid refrigerant entering the compressor.

This balanced system is particularly advantageous since the compressor is driven by the automobile engine which accelerates and decelerates during operation of the vehicle. Thus, as the compressor operates faster with acceleration of the engine, more refrigerant is pumped to the condenser and more refrigerant is forced through the capillary tubes to the evaporator, thereby increasing the temperature of the refrigerant traversing the capillary tubes. At the same time, more refrigerant exits from the evaporator and flows to the compressor so that the increased heat in the capillary tubes is balanced off against the increased cooling in the suction line due to a greater volume of partially vaporized refrigerant flowing to the compressor. Additional heat in the higher temperature liquid refrigerant flowing through the capillary tubes then effects substantially complete if not complete vaporization of the refrigerant traveling to the compressor.

To function as a heat exchanger, the capillary tubes need not be within the suction line but may be in heat exchange relationship with the suction line wherein the capillary tubes are on the outside of the suction line and in engagement therewith along a length thereof so that there is a heat exchange between the hot liquid refrigerant in the capillary tubes and the refrigerant flowing from the evaporator to the compressor in the suction line.

If the capillary tubes are not in heat exchange relationship with the suction line, the balance system does not result because speeding up and slowing down the compressor brings about a presence of liquid refrigerant in the suction line and even into the compressor, thereby rendering the apparatus unsatisfactory.

My invention provides air conditioning or refrigeration apparatus for motor vehicles which has an increased efficiency in the amount of about 20%. This increased efficiency is due in part to the combination of the heat exchange relationship between the capillary tubes and the suction line, in part to continuous metering of refrigerant to evaporator by the capillary tubes to assure a proper amount of refrigerant in the evaporator, and in part to lower operating head pressures afforded by the metering of the refrigerant by the capillary tubes.

The amount of refrigerant in my apparatus is important but not critical for my heat exchange relationship between the capillary tubes and the suction line permits some variance in the amount or charge of refrigerant for which a given air conditioning or refrigeration apparatus is designed. Also, my apparatus uses less refrigerant than conventional models of substantially equal capacity. Specifically, a representative example of my apparatus uses 1 pound of refrigerant, whereas an existing system of equal capacity requires 3 pounds of refrigerant.

The length of the capillary tubes and their inside diameter are important for a given size of condenser, evaporator and pump. For example, one system which uses my invention has a 7–10 cubic inch compressor, a four row 5¼" x 12⅝" face, 12 fins/inch evaporator, and a single or dual pass 14" x 22" 10 fins/inch condenser. This system requires two lengths of capillary tubes 12 feet long and 0.080" inside diameter with about 5 feet of the capillary tubes in heat exchange relationship with the suction line of the apparatus. In this system, the two capillary tubes are disposed within the suction line.

FIGURE 2 shows a modification of my invention in which a single tube 27 extends from the outlet 13 of the condenser 3 to a connection with the two capillary tubes 14 and 15 which are disposed within a housing 28 of the evaporator 5. This tube 27 carries liquid refrigerant from the condenser to the accumulator 4 and then to the two capillary tubes which are in heat exchange disposition within a conduit 29, also located inside the housing 28 and joined to the outlet 11 of the evaporator coil 17. This conduit 29 is a part of the suction line 10 which runs from the evaporator to the compressor.

The two capillary tubes 14 and 15 extend to the inlet 16 of the evaporator coil 17 to deliver liquid refrigerant directly into the evaporator at a pressure drop from that of the liquid refrigerant in the capillary tubes.

The variable speed compressor 2 of the apparatus of FIGURE 2 is driven in the same manner as the variable speed compressor of FIGURE 1.

While an accumulator has been shown in the embodiments of FIGURES 1 and 2, it may be eliminated and an enlarged tube used to provide an element where an amount of liquid refrigerant can be collected and from which the capillary tubes receive the liquid refrigerant.

My invention has important advantages which render it especially suitable for motor vehicles which use a variable speed compressor driven by the engine of the vehicle and which is subject to operation in accordance with deceleration or acceleration of the engine. In the first place, when the compressor is shut off, it has an ability to unload itself and effect a balanced refrigerant pressure at the compressor for the refrigerant has an unrestricted path of flow through the system so that after a shutdown, there is an almost immediate balance of pressure between refrigerant on the inlet side of the compressor and on the discharge side thereof. Accordingly, when the compressor is turned on, there is no pressure differential against which it must operate and thereby no excessive demand upon the vehicle engine to cause the vehicle to hesitate during travel or effect a noticeable slowdown thereof.

In the second place, my apparatus commences to defrost as soon as it is turned off because refrigerant flow stops and there is no receiver to continue to feed refrigerant to the evaporator. Thus, icing up and frosting up of fins and other components of the apparatus are avoided.

In the third place, absence of the expansion valve, receiver, in some cases a drier, and a sight glass lowers maintenance and installation costs and time.

In the fourth place, my apparatus is simple and reliable and, therefore, cheaper to manufacture while simultaneously having a 20% greater efficiency of operation.

Although my invention has been shown as applied to air conditioning apparatus designed for cooling air, it also has utility in refrigeration apparatus adapted for cooling and/or freezing comestibles and maintaining same at a below ambient temperature or in a frozen state.

While I have shown and described preferred embodiments of my invention, it may be otherwise embodied within the scope of the appended claims.

I claim:

1. In air conditioning and refrigeration apparatus for motor vehicles having an evaporator with a single tube which has a refrigerant inlet and a refrigerant outlet, the invention comprising a variable speed engine of said vehicle for operating same, a variable speed compressor driven by said engine of said vehicle, a condenser with a refrigerant inlet and a refrigerant outlet and a pipe joining said compressor to said refrigerant inlet of said condenser, an accumulator means in refrigerant connection with liquid refrigerant from said outlet of said condenser, at least two capillary tubes in refrigerant connection with said accumulator, each of said two capillary tubes extending to and said two capillary tubes having a common refrigerant connection with said inlet of said single tube of said evaporator to effect delivery of liquid refrigerant from said two capillary tubes directly into said evaporator, a conduit extending between said refrigerant outlet of said evaporator and said compressor to form a suction connection for refrigerant between said evaporator and said compressor, a portion of the length of each of said two capillary tubes being disposed inside a part of the length of said conduit to form a heat exchanger between said two capillary tubes and said conduit, said heat exchanger being so located that it extends to a position adjacent said refrigerant outlet of said evaporator, said accumulator means having a refrigerant storage capacity such that it holds an amount of liquid refrigerant which evaporates shortly after said compressor stops operation and it provides a temporary storage of excess refrigerant due to acceleration of the compressor.

2. In air conditioning and refrigeration apparatus for motor vehicles having an evaporator with a single tube which has a refrigerant inlet and a refrigerant outlet, the invention comprising a variable speed engine of said vehicle for operating same, a variable speed compressor driven by said engine of said vehicle, a condenser with a refrigerant inlet and a refrigerant outlet and a pipe joining said compressor to said refrigerant inlet of said condenser, an accumulator means in refrigerant connection with liquid refrigerant from said outlet of said condenser, at least two capillary tubes in refrigerant connection with said accumulator, each of said two capillary tubes extending to and said two capillary tubes having a common refrigerant connection with said inlet of said single tube of said evaporator to effect delivery of liquid refrigerant from said two capillary tubes directly into said evaporator, a conduit extending between said refrigerant outlet of said evaporator and said compressor to form a suction connection for refrigerant between said evaporator and said compressor, a portion of the length of each of said two capillary tubes being disposed in heat exchange relationship with at least a part of the length of said conduit to form a heat exchanger between said two capillary tubes and said conduit, said heat exchanger being so located that it extends to a position adjacent said refrigerant outlet of said evaporator, said accumulator means having a refrigerant storage capacity such that it holds an amount of liquid refrigerant which evaporates shortly after said compressor stops operation and it provides a temporary storage of excess refrigerant due to acceleration of the compressor.

References Cited in the file of this patent

UNITED STATES PATENTS

| | | |
|---|---|---|
| 2,418,853 | Shoemaker | Apr. 15, 1947 |
| 2,482,171 | Gygax | Sept. 20, 1949 |
| 2,981,076 | Gaugler | Apr. 25, 1961 |
| 3,043,119 | Sarukhanian | July 10, 1962 |